Jan. 15, 1929.
C. A. GOODSPEED
1,699,290
VEHICLE ANCHORAGE DEVICE
Filed March 18, 1925
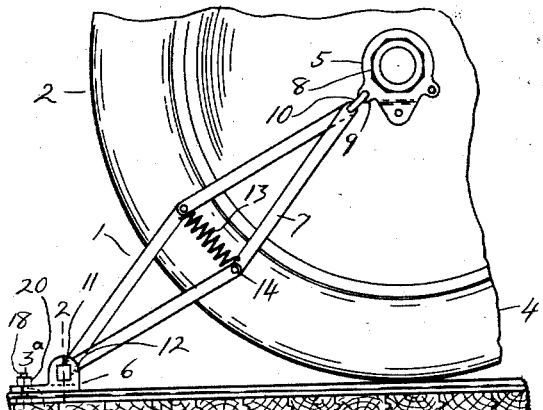
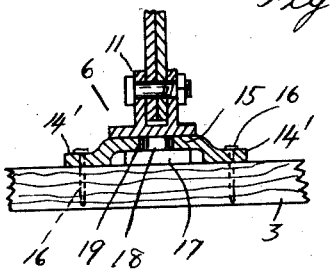
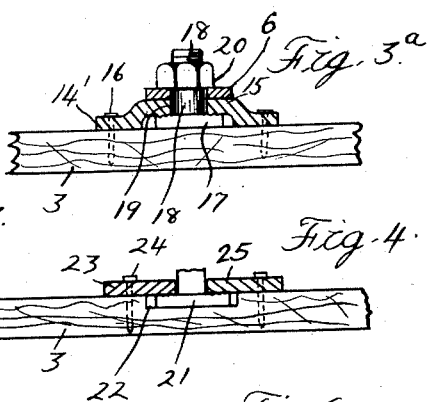
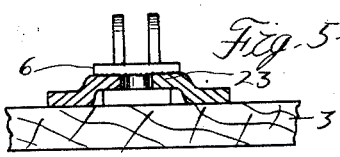
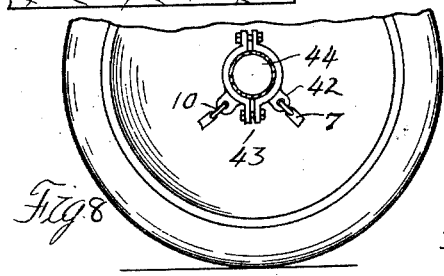
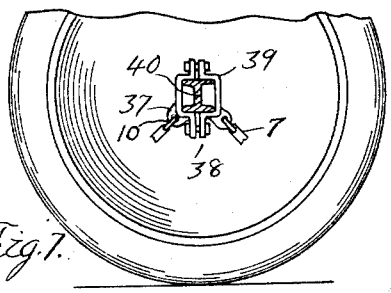
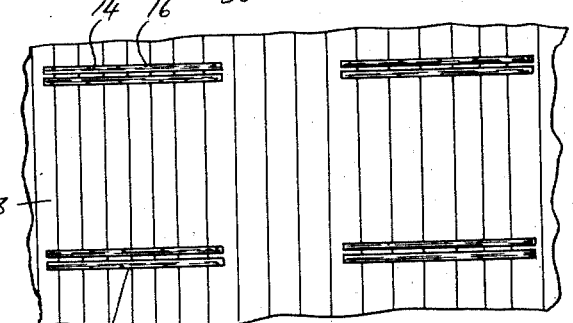
Inventor
Charles A. Goodspeed Patented Jan. 15, 1929.

1,699,290

UNITED STATES PATENT OFFICE.

CHARLES A. GOODSPEED, OF DETROIT, MICHIGAN, ASSIGNOR TO WILLIAM W. BLAKELY, OF DEXTER, MICHIGAN.

VEHICLE ANCHORAGE DEVICE.

Application filed March 18, 1925. Serial No. 16,532.

This invention relates generally to vehicle anchorage devices and refers more particularly to the means for connecting the tie members of such devices to the floors of freight cars and the like.

One of the essential objects of the invention is to provide a simple and reliable connection between the tie members and floor of the freight car that may be readily adjusted longitudinally of the carrier to accommodate vehicles of different lengths.

Another object is to provide effective means for preventing an adjustable connection of this type from slipping after it has been adjusted.

A further object is to provide a construction which can be manufactured at a comparatively low cost and may be easily and quickly assembled.

With the above and other objects in view the invention consists in certain novel features of construction, combinations and arrangements of parts as will be more fully described and particularly pointed out in the appended claims.

In the accompanying drawing;

Figure 1 is a side elevation of an anchorage device embodying my invention holding a vehicle upon the floor of a freight car.

Figure 2 is a sectional view taken on the line 2—2 of Figure 1.

Figure 3 is a top plan view of a part of the construction shown in Figure 2.

Figure 3ª is a sectional view taken on the line 3ª—3ª of Figure 1.

Figure 4 is a fragmentary sectional view through a slightly modified form of construction.

Figure 5 is a fragmentary sectional view through another modified form of construction.

Figure 6 is a cross sectional view through still another modified form of construction.

Figure 7 is a detail view of a modified form of adapter applied to the front axle of a vehicle.

Figure 8 is a detail view of a modified form of adapter applied to the rear axle of a vehicle.

Figure 9 is a top plan view of the retainer plates attached to the floor of a freight car.

Heretofore the floor plates of vehicle anchorage devices have been secured to the floors of suitable carriers by nails. However, it frequently happens that these anchorage devices cannot be used on the same carrier on successive shipments on account of the variation in the length of cars assigned thereto, consequently the nails securing the floor plates to the carrier have to be withdrawn or otherwise removed. This repeated use and withdrawal of nails frequently causes the floors of the carriers to be splintered and otherwise damaged so that they rapidly become unsuitable for transporting vehicles. With the present invention these objections are overcome entirely and I preferably provide suitable connections between the floor plates and the floor of the vehicle that may be readily adjusted while the anchorage device is attached to the floor to accommodate vehicles of different lengths.

Referring now to the drawing in which like characters of reference designate corresponding parts throughout the several views, the numeral 1, designates an anchorage device for holding a motor vehicle 2 upon a suitable support such as the floor 3 of a freight car, while in transit.

In order that the vehicle will be held properly, an anchorage device of this type is preferably located opposite each wheel 4 of the vehicle and preferably comprises an adapter plate 5, floor plates 6, and the intermediate tie members 7. The adapter plate 5 may be any form desired but is preferably mounted on the wheel hub 8 of the vehicle and is provided with suitable depending lugs 9 to which the tie members 7 are preferably attached. These tie members may be any form desired. As shown, each tie member 7 preferably consists of two toggle levers that are connected at their upper ends by a suitable link 10 to a lug 9 of the adapter plate and are connected at their lower ends by a suitable headed element 11 to the spaced upstanding lugs 12 of the floor plates 6. In order that any movement of the vehicle incident to shocks and jars received in transit may be resisted and gradually and effectively cushioned, I preferably provide suitable coil springs 13 that are preferably positioned between the pivots 14 of each pair of toggle levers.

For connecting the floor plates 6 to the floor 3 of the freight car, I preferably provide a pair of complementary retainer plates 14' that are preferably spaced apart upon the floor 3 and are preferably provided at their inner opposed edges with the inwardly extending horizontal flanges 15. These plates 14' preferably extend longitudinally of the floor 3 and are preferably rigidly secured to the floor 3 by suitable nails 16, while the flanges 15 are preferably spaced sufficiently from the upper surface of the floor 3 to receive the heads 17 of suitable bolts 18 which preferably extend upwardly through circular openings 19 in the floor plates 6 of the anchorage device and are secured to the plates by suitable nuts 20. With this construction, the floor plates 6 may be adjusted longitudinally of the floor 3 while attached thereto so that the anchorage device may be applied to vehicles of different lengths.

To prevent the floor plates 6 of the anchorage device from slipping after an adjustment has been made, the upper faces of the bolt heads 17 and the lower faces of the flanges 15 are preferably serrated or otherwise roughened.

In Figure 4 I have shown a slight modification in which the bolt heads 21 are adapted to move longitudinally of suitable channels 22 extending longitudinally of the freight car floor 3. With this construction, flat plates 23 are secured rigidly by suitable nails 24 to the floor 3 of the freight car so that they overhang the adjacent edges of the channels 22. To prevent the floor plates 6 from slipping after an adjustment has been made, the lower faces of the overhanging portions 25 of the plates 23, as well as the upper surfaces of the bolt heads 21 may be serrated or otherwise roughened.

As shown in Figure 5 the upper faces of the plates 23 and the lower faces of the floor plates 6 may be serrated or roughened to prevent the latter from slipping when adjusted.

In Figure 6 I have shown still another modification in which the floor 3 of the freight car is provided with shallow grooves 30 for receiving the retainer plates 31 and are provided between the grooves 30 with a deeper channel 32 for receiving the bolt heads 33. Thus, the upper faces of the retainer plates 31 in this construction are substantially flush with the upper face of the floor 3.

In Figure 7 I have shown still another modification in which the links 10 at the upper ends of the tie members 7 are preferably engaged with suitable lugs 37 extending from the complementary sections 38 of suitable collars 39 which are preferably clamped upon the front axle 40 of the vehicle.

In Figure 8 the links 10 are preferably engaged with the depending lugs 42 of a sectional collar 43 that is clamped upon the rear axle 44 of the vehicle.

In use, the floor plates 6 are adjusted to the desired position, and the adapter plates or collars are secured to the vehicle, whereupon, the links 10 of the anchorage device are engaged with the lugs 9 of the adapter plate. The tie members 7 are then fastened to the lugs 12 of the floor plates by means of the bolts 11. In the modifications the floor plates are adjusted in the same manner as set forth in the foregoing description, the arrangement of parts being slightly modified. In Figure 4 the bolt heads are adapted to move longitudinally of suitable channels provided in the floor of the freight car, while in the modification shown in Figure 6 the retainer plate, as well as the bolt head, is located in grooves provided in the floor of the car. Figures 7 and 8 show the adapter plate as applied to the front and rear axle of a vehicle instead of the wheel hub.

Although I have shown and described my anchorage device in connection with a vehicle, it is readily apparent that the same may be used conveniently for holding other articles of merchandise upon suitable supports.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. The combination with a vehicle, and a support therefor, of a tie member, means for securing the tie member to a portion of the vehicle, a floor plate connected to the tie member, a retainer plate secured to the support, a headed element connecting the floor plate to the retainer plate while permitting said floor plate to be adjusted relative to said retainer plate, and means for preventing said floor plate from slipping after an adjustment has been made.

2. The combination with a vehicle, and a support therefor provided with a longitudinally extending channel, of an anchorage device having a floor plate, spaced retainer plates secured to said support and having portions overhanging the adjacent edges of said channel, and means for adjustably connecting the floor plate to the retainer plates including an element carried by said floor plate having a head slidably engaging the retainer plates.

3. In a merchandise anchoring device, a tie member adapted to be connected at one end to the merchandise, a support for said merchandise, and a connection between said tie member and support including a plate movable over the support and having a pair of spaced upstanding projections connected directly to said tie member, a bolt extending through said plate and having a head at its lower end, and a pair of anchorage members secured rigidly to said support, constituting bearings for said plate, and disposed upon diametrically opposite sides of the bolt above said head, the distance between said anchorage members throughout their length being such as to permit said bolt and plate to move relative to said members but retaining said bolt from being withdrawn from between said members by movement upwardly relative thereto.

In testimony whereof I affix my signature.

CHARLES A. GOODSPEED.